United States Patent
Niu (10) Patent No.: US 10,324,533 B2
(45) Date of Patent: Jun. 18, 2019

(54) TOUCH DEVICE AND FEEDBACK METHOD FOR TOUCH

(71) Applicant: AU OPTRONICS CORPORATION, Hsin-chu (TW)

(72) Inventor: Tzu-Ling Niu, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/588,175

(22) Filed: May 5, 2017

(65) Prior Publication Data

US 2018/0081440 A1 Mar. 22, 2018

(30) Foreign Application Priority Data

Sep. 22, 2016 (TW) .............. 105130668 A (51) Int. Cl.
*G06F 3/01* (2006.01)
*G06F 3/044* (2006.01)
*G06F 3/041* (2006.01)
*G06F 3/042* (2006.01)

(52) U.S. Cl.
CPC .............. *G06F 3/016* (2013.01); *G06F 3/042* (2013.01); *G06F 3/044* (2013.01); *G06F 3/0412* (2013.01); *G06F 3/0416* (2013.01); *G06F 2203/04105* (2013.01); *G06F 2203/04106* (2013.01)

(58) Field of Classification Search
CPC .......... G06F 2203/04105; G06F 3/016; G06F 3/0414; G06F 3/0488; G06F 3/0416; G06F 3/0418; G06F 3/03547; G06F 2203/014

See application file for complete search history.

(56) References Cited

U.S. PATENT DOCUMENTS

| | | | |
|---|---|---|---|
| 6,401,551 | B1 | 6/2002 | Kawahara et al. |
| 8,633,916 | B2 | 1/2014 | Bernstein et al. |
| 2009/0058829 | A1 | 3/2009 | Kim et al. |
| 2010/0098303 | A1 | 4/2010 | Chen |

(Continued)

FOREIGN PATENT DOCUMENTS

| CN | 102298479 A | 12/2011 |
|---|---|---|
| CN | 102929437 A | 2/2013 |

(Continued)

OTHER PUBLICATIONS

Office Action issued by (TIPO) Intellectual Property Office, Ministry of Economic Affairs, R. O. C. dated Feb. 7, 2017 for Application No. 105130668, Taiwan.

(Continued)

*Primary Examiner* — Dong Hui Liang
(74) *Attorney, Agent, or Firm* — Tim Tingkang Xia, Esq.; Locke Lord LLP (57) ABSTRACT

A touch controlling device includes a sensing module, a processor and a feedback generator. The sensing module senses first coordinates and second coordinates. The processor generates an touch area difference according to the first coordinates and the second coordinates. The feedback generator generates a feedback corresponding to the touch area difference. Specifically, the touch device determines the force of touch based on the touch area difference without any force sensing plate attached thereon. Consequently, the thickness of the touch device and the cost of the touch device are reduced.

13 Claims, 9 Drawing Sheets (56) References Cited

U.S. PATENT DOCUMENTS

| | | | |
|---|---|---|---|
| 2010/0187216 A1* | 7/2010 | Komada | H03K 17/962 |
| | | | 219/443.1 |
| 2012/0113061 A1* | 5/2012 | Ikeda | G06F 3/041 |
| | | | 345/175 |
| 2012/0146930 A1 | 6/2012 | Lee | |
| 2012/0191993 A1* | 7/2012 | Drader | G06F 1/3215 |
| | | | 713/320 |
| 2012/0193211 A1* | 8/2012 | Ciesla | G06F 3/0202 |
| | | | 200/81 H |
| 2013/0038576 A1 | 2/2013 | Chen et al. | |
| 2015/0029157 A1* | 1/2015 | Wang | G06F 3/03547 |
| | | | 345/175 |
| 2017/0192602 A1* | 7/2017 | Kim | G06F 3/0488 |

FOREIGN PATENT DOCUMENTS

| | | |
|---|---|---|
| CN | 103246379 A | 8/2013 |
| CN | 102612676 B | 9/2015 |
| TW | 200743012 A | 11/2007 |
| TW | M327066 U | 2/2008 |
| TW | I425380 B | 2/2014 |
| TW | 201640414 A | 11/2016 |

OTHER PUBLICATIONS

"Deeply reveal the iPhone 6s "touch interactive" technology: 3D Touch", Tech News, pp. 1-7, Sep. 12, 2015.

"Huawei has robbed the first iPhone 6s Force Touch there Han material", zhidx.com, pp. 1-6, Sep. 6, 2015.

Office Action issued by the State Intellectual Property Office of the Peoples Republic of China dated Jan. 4, 2019 for Application No. CN201610989994.3.

\* cited by examiner

TOUCH DEVICE AND FEEDBACK METHOD FOR TOUCH

CROSS-REFERENCE TO RELATED PATENT APPLICATION

This application claims the benefit of priority under 35 U.S.C. § 119(a) to Taiwan Patent Application No. 105130668, filed in Taiwan, R.O.C. on Sep. 22, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates to the field of touch control display, and in particular, to a touch device capable of sensing a force and a feedback method for touch.

BACKGROUND

With the recent development of capacitive touch control technology, a display screen with touch control technology is welcome by current customers. In the capacitive touch control technology at present, a location of a touch or a track of a touch may be calculated by means of change of a capacitance value caused by pressing a touch screen with a finger or a stylus. A processor of a 3C product makes a corresponding operation reaction according to the location of the touch or the track of the touch.

However, a current capacitive touch panel only can calculate a location or track and cannot sense a force of a touch. In other words, the capacitive touch panel can calculate x and y locations of a press, but cannot estimate a depth of the press in a z direction, and as compared with a conventional mechanical key, still has disadvantages. In order to sense the press in the z direction, a solution at present is to make the capacitive touch panel and an additional force touch sensor adhere to each other, so as to sense intensity of the force by using the force touch sensor to sense a tiny deformation of the touch panel. However, disposing the force touch sensor would increase a thickness of a 3C product and cannot satisfy a trend of thin and light 3C products. In addition, if the force touch sensor is located between the touch panel and a backlight module, the force touch sensor may affect an optical property of the touch panel and also has other disadvantageous such as a complex adhering procedure, a decrease of a yield rate, and an increase of manufacturing costs.

SUMMARY

To resolve the above problems encountered, a touch device and a feedback method for touch are provided herein. The touch device includes a sensing module, a processor, and a feedback generator. The sensing module is configured to sense a first coordinate combination and a second coordinate combination. The processor generates a touch area difference according to the first coordinate combination and the second coordinate combination. The feedback generator generates a touch feedback corresponding to the touch area difference. In an embodiment, the touch feedback comprises a vibration, a flash, a sound, or an image change.

In an embodiment, the processor generates a first area and a second area respectively according to the first coordinate combination and the second coordinate combination, where the touch area difference is a difference between the first area and the second area. Further, the sensing module includes a plurality of photosensitive components, and the photosensitive components sense the first coordinate combination for a first touch and sense the second coordinate combination for a second touch, where the first coordinate combination is not equal to the second coordinate combination.

In an embodiment, the touch device further includes a display panel, the display panel including a plurality of sub-pixel units, where the photosensitive components are disposed between the sub-pixel units correspondingly. Generally, the photosensitive components are embedded into or integrated with the display panel and may be simultaneously formed in a processing procedure of manufacturing the display panel. Further, the display panel further includes a plurality of color filter layers respectively corresponding to the sub-pixel units, but the color filter layers do not correspond to the photosensitive components. In addition, the color filter layers do not overlap with the photosensitive components.

A feedback method for touch is further provided herein. The feedback method for touch includes sensing a first coordinate combination, sensing a second coordinate combination, generating a touch area difference according to the first coordinate combination and the second coordinate combination, and generating a touch feedback according to the touch area difference.

In an embodiment, steps of sensing the first coordinate combination and the second coordinate combination include: sensing the first coordinate combination for a first pressure; and after a predetermined period, sensing the second coordinate combination for a second pressure. That is, the touch area difference is a change of an area size calculated according to the coordinate combinations of a press before and after the predetermined period, so as to further generate a touch feedback according to the touch area difference.

In an embodiment, the step of generating the touch area difference includes: generating a first area and a second area respectively according to the first coordinate combination and the second coordinate combination, where the touch area difference is a difference between the first area and the second area.

In an embodiment, the step of generating the touch feedback includes: when the touch area difference exceeds a threshold, generating the touch feedback. In this way, a mistaken touch may be prevented from immediately generating a touch feedback, thereby producing effects of filtering a signal and saving power.

In an embodiment, after the first coordinate combination is sensed, a security authentication program is executed to determine whether to perform the step of sensing the second coordinate combination. Herein, the security authentication program may be determining whether a fingerprint is the same as a pre-stored fingerprint. Herein, the security authentication program may be fingerprint recognition and is determining whether a fingerprint of a press is the same as a fingerprint of a predetermined user. In this way, the touch device may be prevented from causing a loss because of misappropriation in terms of the finance or treatment.

In an embodiment, the first coordinate combination corresponds to a first pressure, the second coordinate combination corresponds to a second pressure, and the first pressure is not equal to the second pressure. That is, a change of a pressure of a touch is determined by sensing coordinate combinations and a touch area difference.

In an embodiment, the step of sensing the first coordinate combination and the step of sensing the second coordinate combination are performed simultaneously. That is, the touch control feedback manner may be applied to multi-point touch control. In this way, the touch device is enabled to generate more flexible operation properties.

In conclusion, in the foregoing touch device and feedback method for touch, an embedded sensing module and a processor are used to calculate a press force in a z direction by using a touch area difference of a touching object and actuate, according to the press force, a feedback generator to generate a touch feedback. Therefore, the touch device can produce a three-dimensional touch control effect without requiring an additional touch force sensor. Hence, a thickness and manufacturing costs of the touch device can be reduced and optical quality and a product yield rate can be maintained.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
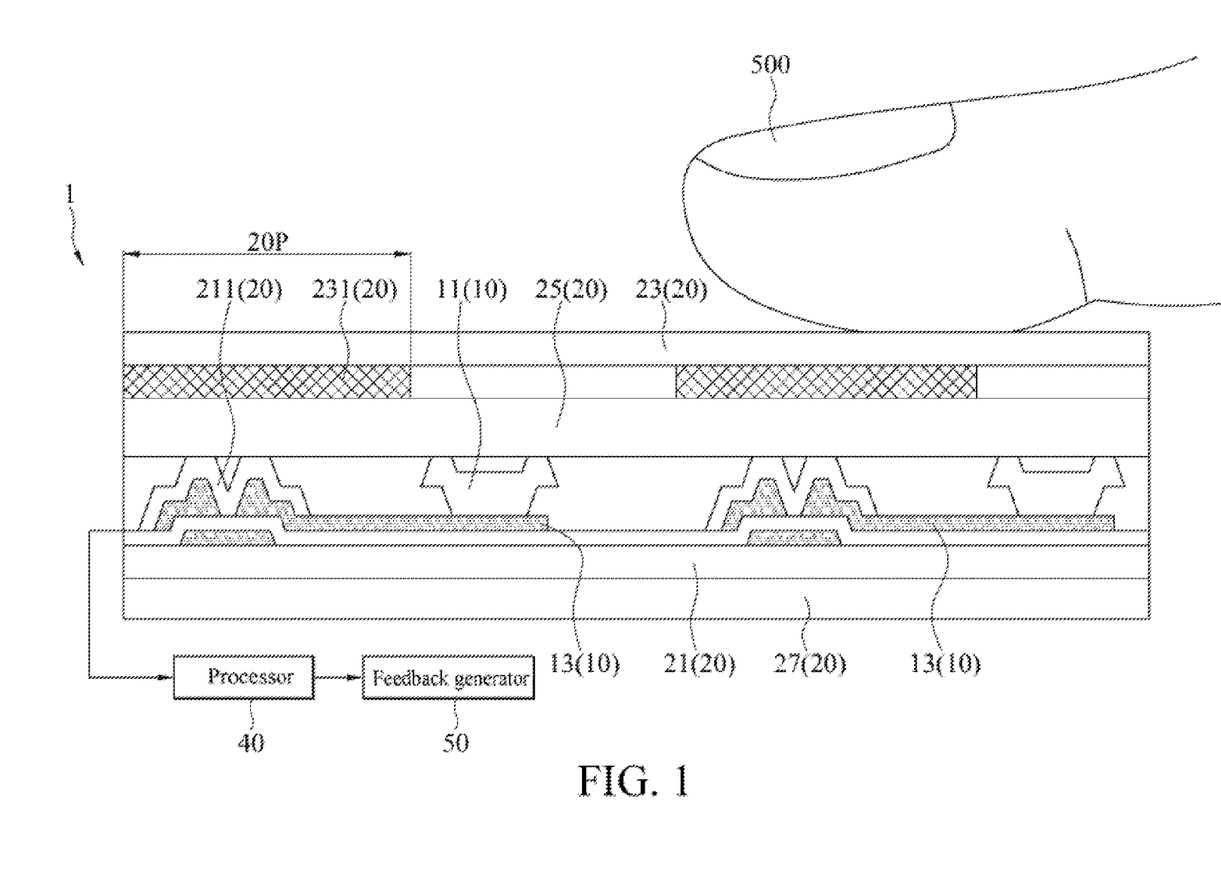
FIG. 1 is a partial sectional view of a first embodiment of a touch device.
Figure 2:
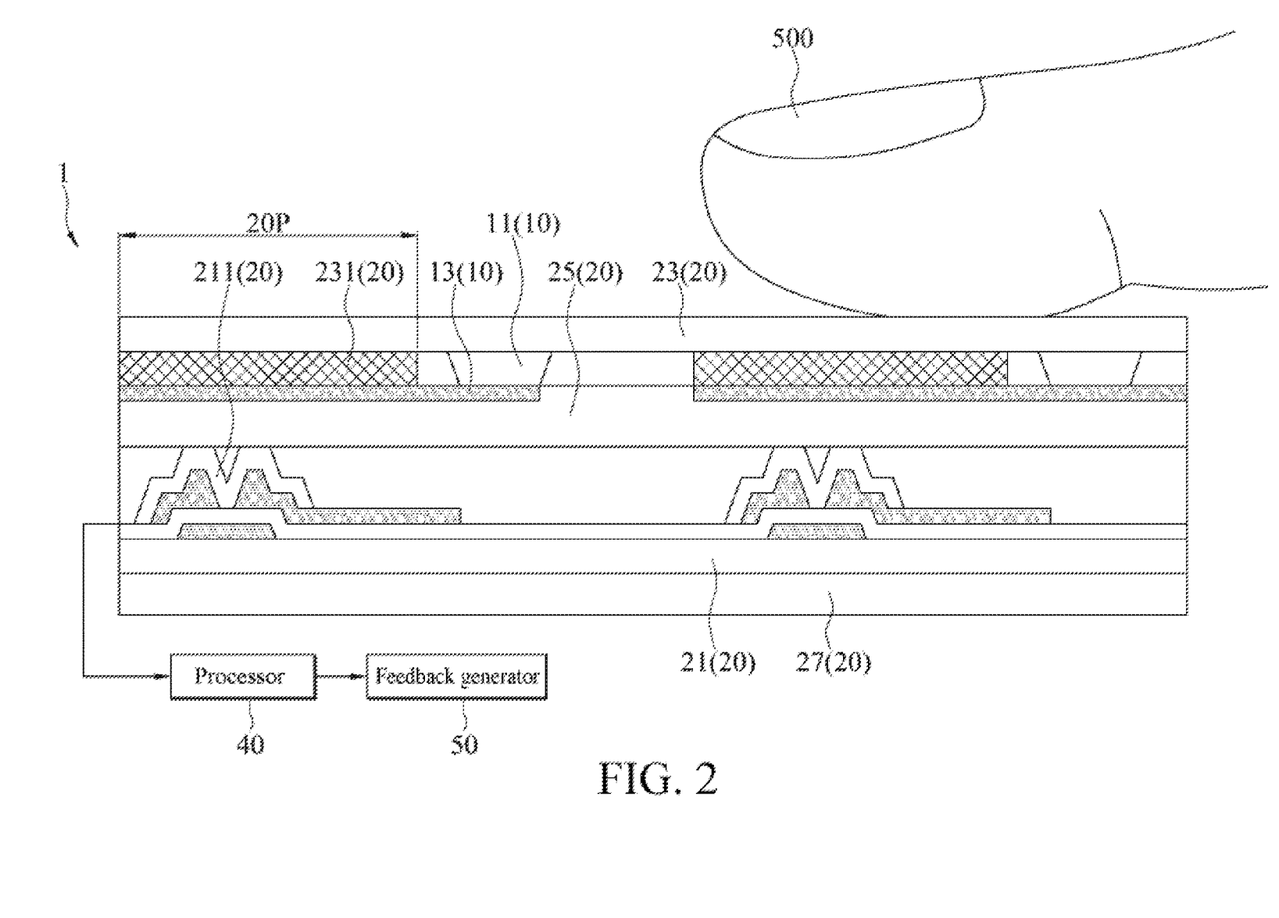
FIG. 2 is a partial sectional view of a second embodiment of a touch device.

Refer to FIG. 1 and FIG. 2, which are respectively a partial sectional view of a first embodiment of and a partial sectional view of a second embodiment of a touch device. As shown in FIG. 1 and FIG. 2, a touch device 1 includes a sensing module 10, a processor 40, and a feedback generator 50. The sensing module 10 is embedded in a display panel 20. The sensing module 10 includes at least one photosensitive component 11 and at least one electrode 13. The electrode 13 is configured to sense a coordinate combination, and further, to obtain a coordinate combination by sensing a capacitance change generated by a touching object 500. Herein, there may be one or more electrodes 13. For example, the electrode 13 may be a pixel electrode, a common electrode, or an additional sensing electrode of the display panel and may obtain a capacitance or photocurrent change generated by the corresponding touching object 500 by self-capacitive sensing, mutual-capacitive sensing, or a sensing manner in another form. The electrode 13 may be electrically connected to the processor 40 and transfers the capacitance or photocurrent change to the processor 40 to read, so as to obtain a coordinate combination. The coordinate combination may be a set of coordinates, for example, a set of a plurality of coordinates located in an area having (x1, y1) as the center.

An area pressed on the display panel 20 is calculated by sensing the coordinate combination, for example, an area pressed by the corresponding touching object 500 on the display panel 20 is obtained by sensing a light ray change of the coordinate combination. The photosensitive component 11 may be implemented by using a Complementary Metal-Oxide-Semiconductor (CMOS), a photosensitive coupled component, namely, a Charge-coupled Device (CCD), or the like. A raw image (raw data) is generated by means of a light ray change sensed by the photosensitive component 11. The processor 40 is electrically connected to the sensing module 10, obtains a coordinate combination according to a location of the raw image (raw data), and can process the raw image to obtain an image of the touching object 500 pressed on the display panel 20, for example, a fingerprint image. In FIG. 1 and FIG. 2, a finger is used as an example of the touching object 500, and a fingerprint image of the finger may be obtained by sensing performed by the photosensitive component 11, but the touching object 500 is not limited thereto, and in fact, another touching manner, such as a stylus, may also be used. Scales of respective components in the drawings merely facilitate reading and understanding, and the components are not drawn according to the actual scales.

The processor 40 is electrically connected to the sensing module 10, and a first area and a second area may be respectively obtained on the basis of coordinate combinations, for example, a first coordinate combination and a second coordinate combination. Herein, the first coordinate combination is not equal to the second coordinate combination. The processor 40 further obtains a touch area difference according to a difference between the first area and the second area. The feedback generator 50 is electrically connected to the processor 40, and the feedback generator 50 is actuated by the processor 40 to generate a touch feedback corresponding to the touch area difference. The touch feedback is a vibration, a flash, a sound, or an image change of the display panel 20. Herein provided are only examples, and the present disclosure is not limited thereto.

As shown in FIG. 1, the display panel 20 of the first embodiment is a capacitive touch control liquid crystal display panel, and the display panel 20 includes a first substrate 21, a second substrate 23, a liquid crystal layer 25, and a backlight module 27. The display panel 20 defines a plurality of sub-pixel units 20P, for example, a red sub-pixel unit, a green sub-pixel unit, and a blue sub-pixel unit that are defined by means of color filter layer 231. Herein provided are only examples, and the present disclosure is not limited thereto. The photosensitive component 11 is correspondingly disposed between the sub-pixel units 20P. In this embodiment, the photosensitive component 11 is disposed on a surface of the first substrate 21, where the electrode 13 is a pixel electrode on the first substrate 21, and is electrically connected to a thin film transistor 211 on the first substrate 21, that is, the photosensitive component 11 may be manufactured together with the thin film transistor 211 in array processing. The color filter layer 231 is disposed on a surface of the second substrate 23, and faces the first substrate 21. The color filter layer 231 corresponds to the thin film transistor 211, but does not correspond to the photosensitive component 11. Only an example is provided herein. In fact, the number of electrodes 13 and locations thereof may also be changed. For example, a common electrode of the display panel 20 is used as the electrode 13, or a touch control electrode is additionally disposed in the first substrate 21 or second substrate 23.

As shown in FIG. 2, a display panel 20 of the second embodiment is a capacitive touch control liquid crystal display panel, but a configuration manner thereof is different from that of the first embodiment. In the second embodiment, a photosensitive component 11 is located on a second substrate 23, and is at a location, which is not coated with a color filter layer 231, of a sub-pixel unit 20P. An electrode 13 is a common electrode on the second substrate 23 and is electrically connected to the photosensitive component 11. Herein, the color filter layer 231 does not overlap with the photosensitive component 11. Similarly, a location of the electrode 13 is also exemplary. In fact, the number of electrodes 13 and locations thereof may also be changed. For example, a pixel electrode of the first substrate 21 is used as the electrode 13, or a touch control electrode is additionally disposed in the second substrate 23, which are both manners that can be implemented. As shown in FIG. 1 and FIG. 2, the photosensitive component 11 may be disposed on the first substrate 21 or second substrate 23, but needs to sense light corresponding to a transparent region and does not overlap with the color filter layer 231.

Figure 3:
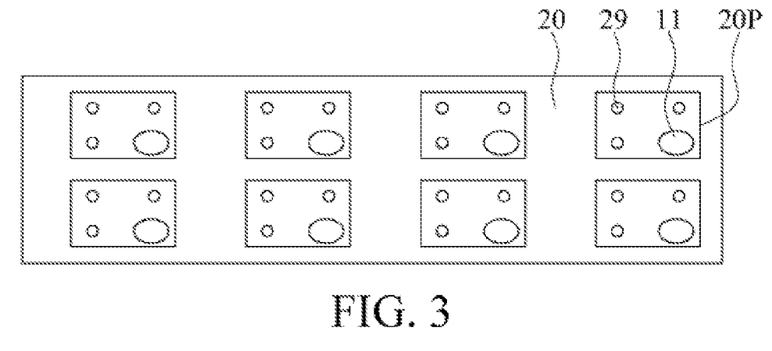
FIG. 3 is a partial sectional view of a third embodiment of a touch device.

Refer to FIG. 3, which is a partial sectional view of a third embodiment of a touch device. As shown in FIG. 3, a display panel 20 of the third embodiment is a capacitive touch control self-light-emitting display panel. A sub-pixel unit 20P of the display panel 20 includes multiple light-emitting components 29, the light-emitting components 29 may be light-emitting diodes (LEDs) or organic light-emitting diodes (OLEDs) of different colors, and in this way, the liquid crystal layer 25, color filter layer 231, and backlight module of the first embodiment and the second embodiment are not needed. The photosensitive component 11 may be disposed in a region, where the light-emitting component 29 is not deployed, of the sub-pixel unit 20P and does not overlap with the light-emitting components 29. For example, three light-emitting components 29, namely, a red LED, a blue LED, and a green LED, and the photosensitive component 11 are disposed in the same sub-pixel unit 20P. An electrode 13 of the third embodiment may be implemented as a pixel electrode, a common electrode, or an additionally disposed touch control electrode.

The foregoing structural configurations of FIG. 1 to FIG. 3 are merely exemplary, where an in-cell electrode is merely used, but the present disclosure is not limited thereto, and may be used on a structure of an array thin film transistor coated with a color filter layer, namely, color filter on array (COA), as a hybrid electrode, and in a structure of an on-cell electrode.

Figure 4:
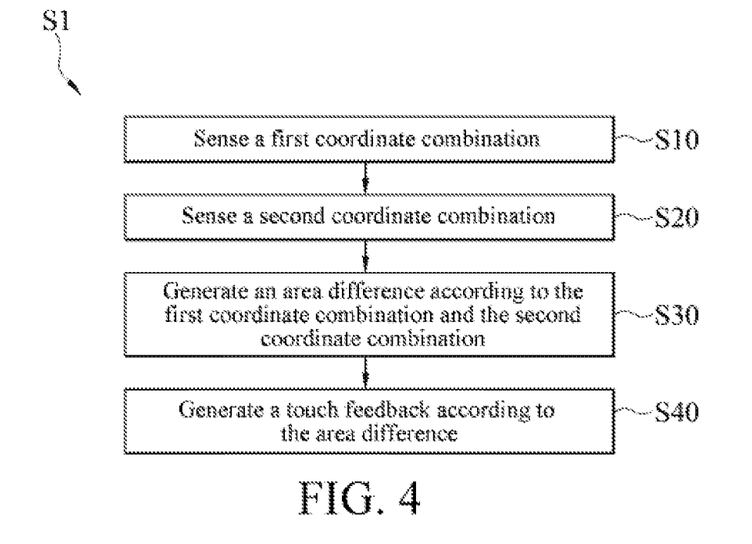
FIG. 4 is a flowchart of a first embodiment of a feedback method for touch.

Referring to FIG. 4, FIG. 4 is a flowchart of a first embodiment of a feedback method for touch. A feedback method for touch S1 of the first embodiment includes a step S10 of sensing a first coordinate combination, a step S20 of sensing a second coordinate combination, a step S30 of generating an touch area difference according to the first coordinate combination and the second coordinate combination, and a step S40 of generating a touch feedback according to the touch area difference.

Referring to FIG. 1 and FIG. 2, the step S10 of sensing a first coordinate combination is sensing, by a sensing module 10, a first pressure corresponding to a press of a touching object 500 to generate a raw image (raw data), and obtaining, by a processor 40, a first coordinate combination according to a location where the raw image is generated. The step S20 of sensing a second coordinate combination is sensing, by the sensing module 10, a second pressure corresponding to a press of the touching object 500 to generate a raw image, and obtaining, by the processor 40, a second coordinate combination according to a location where the raw image is generated. In the first embodiment, the step S10 of sensing the first coordinate combination is prior to the step S20 of sensing the second coordinate combination.

According to the step S30 of generating an touch area difference according to the first coordinate combination and the second coordinate combination, the processor 40 obtains a first area and a second area respectively according to the first coordinate combination and the second coordinate combination and obtains an touch area difference, where the touch area difference is a difference between the first area and the second area. Referring to FIG. 1 and FIG. 2, the step S40 of generating a touch feedback according to the touch area difference includes generating a touch feedback by means of a feedback generator 50 according to the touch area difference. Herein, the feedback generator 50 is actuated by a processor 40 to generate a touch feedback. The touch feedback can be a vibration, a flash, a sound, or an image change of a display panel 20.

Figure 5:
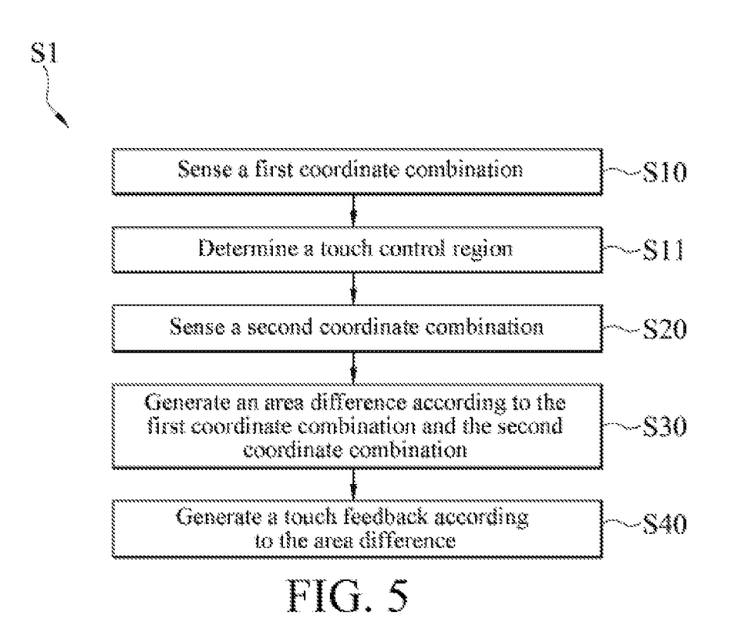
FIG. 5 is a flowchart of a second embodiment of a feedback method for touch.

Referring to FIG. 5, FIG. 5 is a flowchart of a second embodiment of a feedback method for touch. The second embodiment is a variant embodiment based on the first embodiment of the feedback method for touch. As shown in FIG. 5, the second embodiment includes a step S11 of determining a touch control region, where the step S11 of determining a touch control region is performed between the step S10 of sensing a first coordinate combination and the step S20 of sensing a second coordinate combination. In the step S11 of determining a touch control region, the processor 40 determines a touch control region according to the first coordinate combination, for example, assuming that a central point (x1, y1) of the first coordinate combination is a center, a region formed by expanding the central point outward by (x1+10, y1+10), (x1+10, y1−10), (x1−10, y1+10), and (x1−10, y1−10) is the touch control region. The above is merely exemplary, and the present disclosure is not limited thereto. Afterward, the step S20 of sensing a second coordinate combination is performed in the touch control region, that is, the processor 40 only drives a relevant electrode 13 and photosensitive component 11 in the touch control region to perform sensing, so as to shorten a reaction time and at the same time, produce a power-saving effect.

Figure 6:
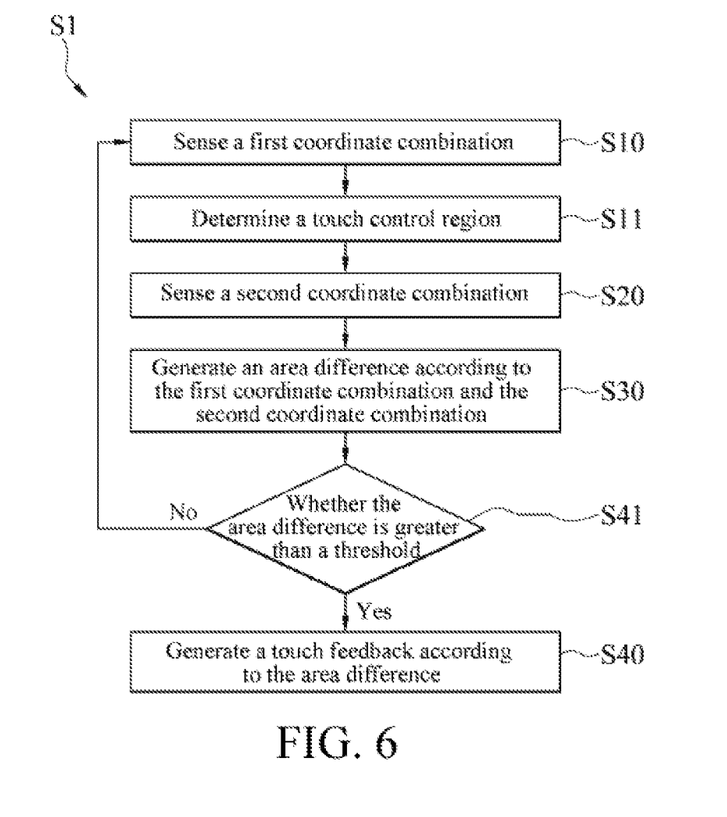
FIG. 6 is a flowchart of a third embodiment of a feedback method for touch.

Referring to FIG. 6, FIG. 6 is a flowchart of a third embodiment of a feedback method for touch. The third embodiment is a variation based on the second embodiment. As shown in FIG. 6, herein, before the step S40 of generating a touch feedback according to the touch area difference, the third embodiment further includes: a step S41 of determining whether the touch area difference is greater than a threshold, and when the processor 40 determines that the touch area difference is greater than the threshold, performing the step S40 of generating a touch feedback according to the touch area difference, where the processor 40 actuates a feedback generator 50 to generate a touch feedback. However, if it is determined that the touch area difference does not exceed the threshold, the step S10 of sensing a first coordinate combination is performed again to perform the sensing.

Herein, the touch area difference is an absolute value, that is, the absolute value of the value obtained by subtracting the first area from the second area. The difference obtained by subtracting the first area from the second area may be a positive value or a negative value, and the touch feedbacks may differ corresponding to the difference between the first area and the second area. For example, when the difference between the first area and the second area is a positive value, a first vibration is generated; when the positive value of the touch area difference exceeds a predetermined value, a second vibration is generated; when the difference between the first area and the second area is a negative value, a third vibration is generated, the second vibration may be different from the first vibration, and the third vibration may be different from the first vibration or second vibration. In addition, touch feedbacks in different forms may be generated according to magnitudes of the touch area differences, so that there are more modes corresponding to press changes.

Figure 7:
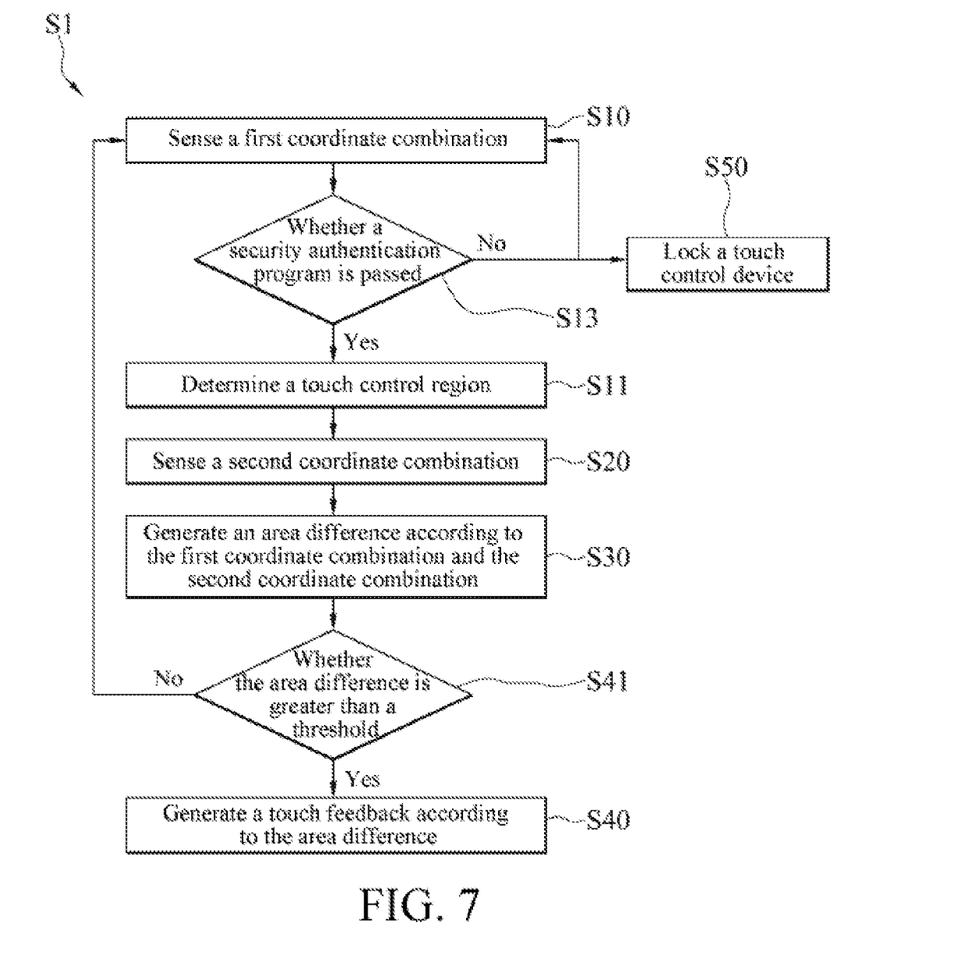
FIG. 7 is a flowchart of a fourth embodiment of a feedback method for touch.

Referring to FIG. 7, FIG. 7 is a flowchart of a fourth embodiment of a feedback method for touch. As shown in FIG. 7, the fourth embodiment of the feedback method for touch is a variation based on the third embodiment. A feature of the fourth embodiment is after the step S10 of sensing a first coordinate combination, the feedback method for touch S1 further includes a step S13 of determining whether a security authentication program is passed. After the security authentication program is passed, the step S11 of determining a touch control region and the step S20 of sensing a second coordinate combination is performed, and if the security authentication program is not passed, a step S50 of locking a touch device is performed or the step S10 of sensing a first coordinate combination is performed again.

Herein, the step S13 of determining whether a security authentication program is passed may be a fingerprint recognition program, a processor 40 determines whether a fingerprint image sensed by a photosensitive component 11 is the same as a pre-stored default fingerprint image, and when the fingerprint image are the same, the step S11 of determining a touch control region and the step S20 of sensing a second coordinate combination are continuously performed. The above is merely exemplary, and the present disclosure is not limited thereto. For example, the step may be performed by means of inputting a password or a specific sliding program, and if the touch device 1 involves a financial transaction or a payment program, misappropriation may be prevented by means of the security authentication program. Moreover, by means of the step S13 of determining whether a security authentication program is passed, a relevant outflow of personal assets and financial losses may be avoided.

Figure 8:
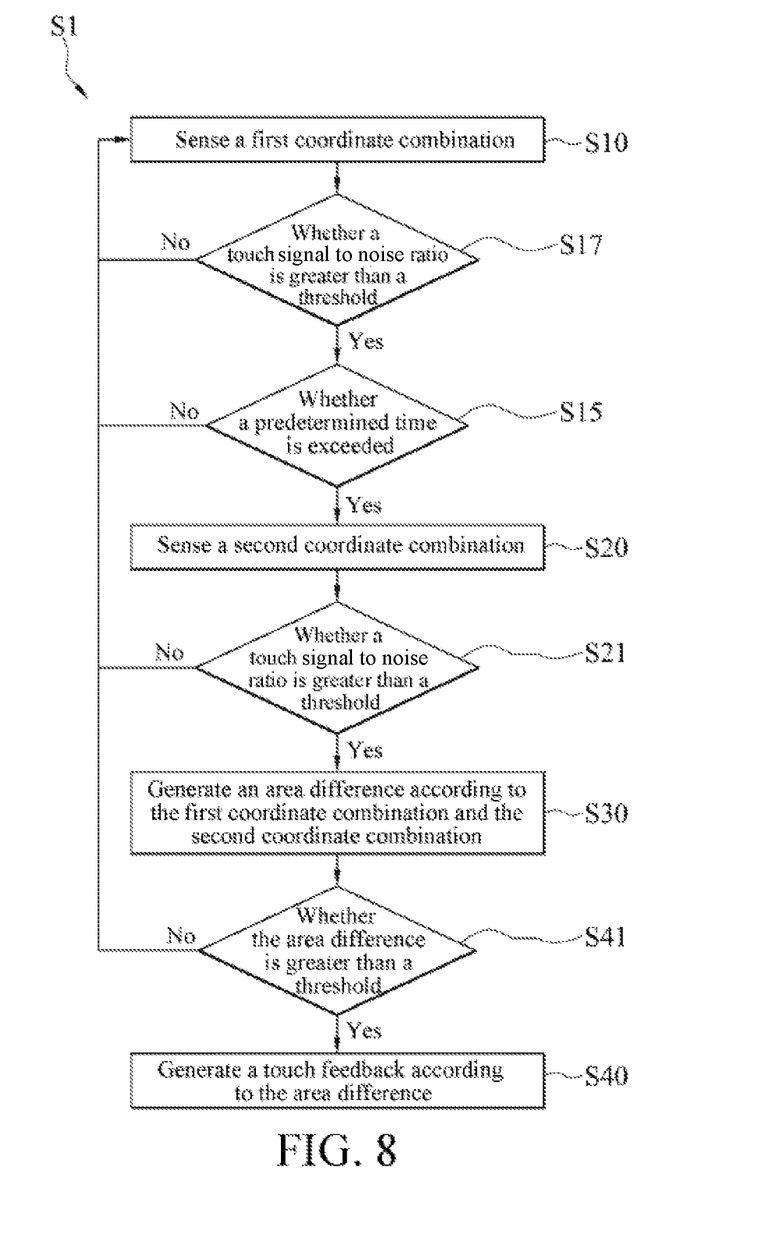
FIG. 8 is a flowchart of a fifth embodiment of a feedback method for touch.

Referring to FIG. 8, FIG. 8 is a flowchart of a fifth embodiment of a feedback method for touch. The fifth embodiment is a variant embodiment based on the first embodiment and second embodiment. Before the step S20 of sensing a second coordinate combination, the fifth embodiment further includes a step S15 of determining whether a touch exceeds a predetermined time. The predetermined time may range from 3 seconds to 10 seconds, for example, 3 seconds, 5 seconds, 10 seconds, and the like. The above are merely exemplary, and the present disclosure is not limited thereto. When the touch exceeds the predetermined time, a sensing module 10 further senses a second coordinate combination for a second pressure corresponding to a press of a touching object 500. However, if the predetermined time is not exceeded, the step S10 of sensing a first coordinate combination is performed again. In this way, a mistaken touch or a hit can be prevented from generating a touch feedback, which can produce a power-saving effect, also avoid a problem that a touch device 1 will overheat because of performing calculation for a long time so as to increase a service life of the touch device 1.

Further, after the step S10 of sensing a first coordinate combination, a step S17 of determining whether a touch signal to noise ratio is greater than a threshold is further included. With regard to definitions of a signal and a noise, a sensed volume before the touching object 500 is in contact with the touch device 1 is defined as a noise which may be ambient light, a thermal noise, a flicker noise, or the like of a structure of a photosensitive component. A sensed volume after the touching object 500 is in contact with the touch device 1 is defined as a touch signal, a proportion of the touch signal/noise is defined as a touch signal to noise ratio, and a threshold of the touch signal to noise ratio may be preset to 5, that is, the strength of a touch signal volume is five times than that of a noise volume. Herein provided are only examples, and the present disclosure is not limited thereto. When the touch signal to noise ratio is greater than the threshold, the step S20 of sensing a second coordinate combination is performed. If the threshold is not exceeded, the step S10 of sensing a first coordinate combination is performed again to sense the first coordinate combination again. In other variant embodiments, a sequence of the step S17 of determining whether a touch signal to noise ratio is greater than a threshold may be exchanged with that of the step S15 of determining whether a touch exceeds a predetermined time, that is, the step S15 of determining whether a touch exceeds a predetermined time is prior to the step S17 of determining whether a touch signal to noise ratio is greater than a threshold.

Similarly, after the step S20 of sensing a second coordinate combination, a step S21 of determining whether a touch signal to noise ratio is greater than a threshold may be further included, and when the touch signal to noise ratio is greater than the threshold, the step S30 of generating an touch area difference according to the first coordinate combination and the second coordinate combination is performed. If the threshold is not exceeded, the step S10 of sensing a first coordinate combination is performed again. In this embodiment, there are steps of determining whether a touch signal to noise ratio is greater than a threshold both before and after the step S20 of sensing a second coordinate combination, and to facilitate definition, the step S17 is a first step of determining whether a touch signal to noise ratio is greater than a threshold, the step S21 is a second step of determining whether a touch signal to noise ratio is greater than a threshold, and the step S17 is prior to the step S21.

Figure 9:
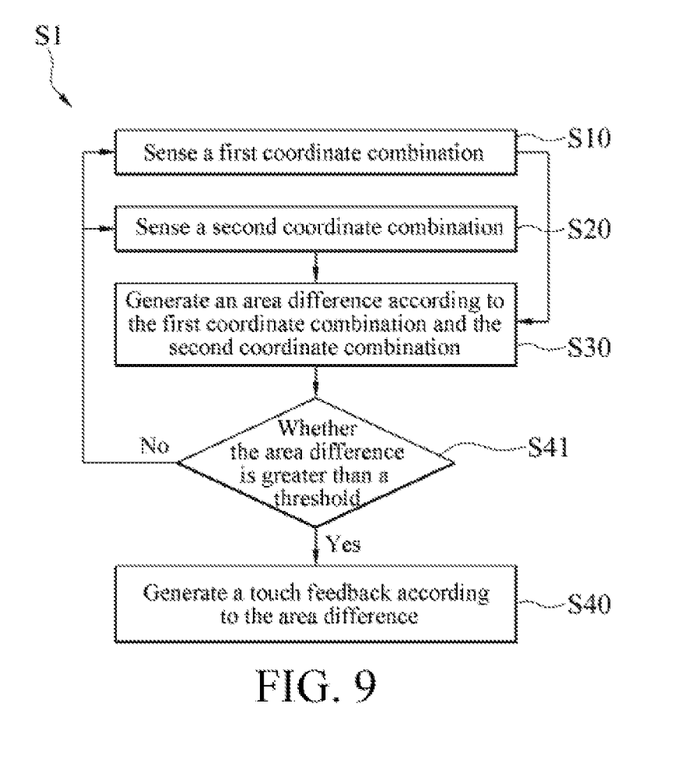
FIG. 9 is a flowchart of a sixth embodiment of a feedback method for touch.

Referring to FIG. 9, FIG. 9 is a flowchart of a sixth embodiment of a feedback method for touch. As shown in FIG. 9, a feedback method for touch S1 of the sixth embodiment of a feedback method for touch also includes a step S10 of sensing a first coordinate combination, a step S20 of sensing a second coordinate combination, a step S30 of generating an touch area difference according to the first coordinate combination and the second coordinate combination, and a step S40 of generating a touch feedback according to the touch control touch area difference. The feature of the sixth embodiment differs from other embodiments is that the step S10 of sensing a first coordinate combination and the step S20 of sensing a second coordinate combination are performed simultaneously. Herein, the step S10 of sensing a first coordinate combination and the step S20 of sensing a second coordinate combination are simultaneously sensing coordinate combinations of touches at different locations.

According to the step S30 of generating an touch area difference according to the first coordinate combination and the second coordinate combination, the touch area difference is obtained from a first area and a second area that are sensed by a processor 40 according to presses of different point touches. Method of the sixth embodiment provides an effect of generating a feedback after sensing multi-point touch control, so that more flexible and diverse operation modes are provided for a touch control operation.

Figure 10:
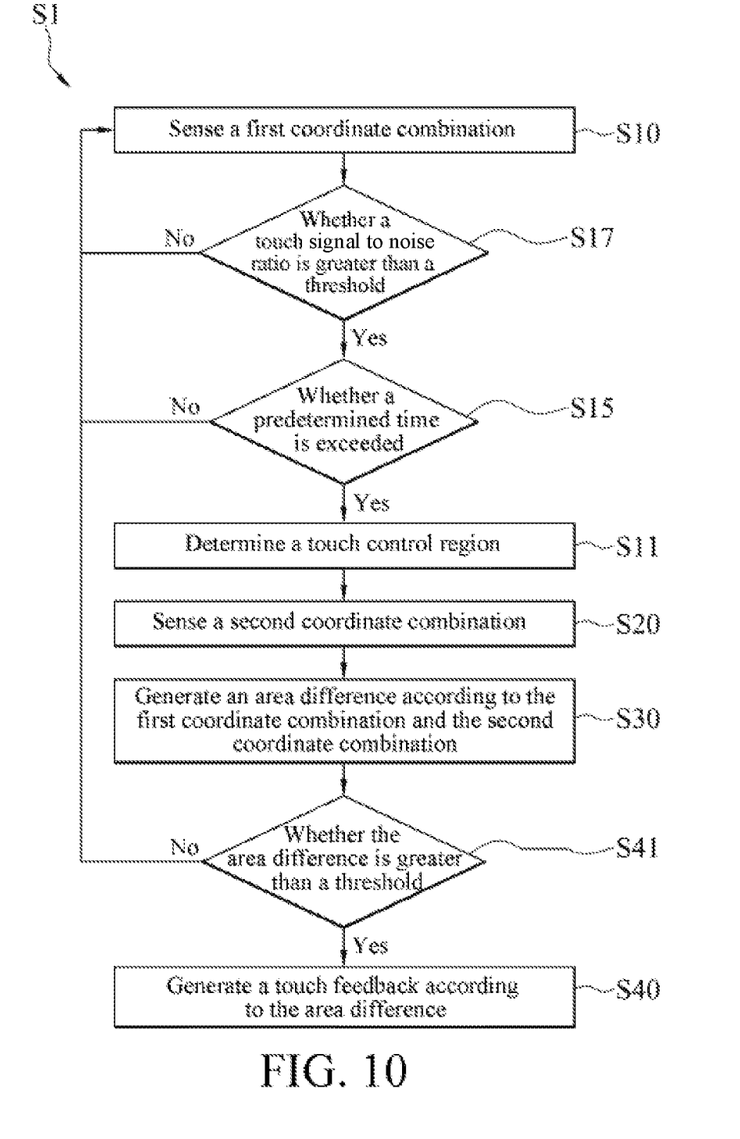
FIG. 10 is a flowchart of a seventh embodiment of a feedback method for touch.

Referring to FIG. 10, FIG. 10 is a flowchart of a seventh embodiment of a feedback method for touch. As shown in FIG. 10, a feedback method for touch S1 of the seventh embodiment of the feedback method for touch also includes a step S10 of sensing a first coordinate combination, a step S20 of sensing a second coordinate combination, a step S30 of generating an touch area difference according to the first coordinate combination and the second coordinate combination, and a step S40 of generating a touch feedback according to the touch area difference. In addition, after the step S10 of sensing a first coordinate combination, a step S17 of determining whether a touch signal to noise ratio is greater than a threshold, a step S15 of determining whether a touch exceeds a predetermined time, and a step S11 of determining a touch control region are further included in sequence. That is, when it is determined that a touch signal to noise ratio is greater than a threshold, it is still needed to determine whether a touch exceeds a predetermined time, and after determining that the touch signal to noise ratio is greater than the threshold and the touch exceeds the predetermined time, a processor determines a touch control region according to the first coordinate combination and performs the step S20 of sensing a second coordinate combination in the touch control region. If the touch signal to noise ratio does not exceed threshold or the touch does not exceed the predetermined time, the step S10 of sensing a first coordinate combination is performed again to sense the first coordinate combination again.

In addition, in the step S40 of generating a touch feedback according to the touch control touch area difference, the seventh embodiment further includes: a step S41 of determining whether the touch area difference is greater than a threshold, and when the processor 40 determines that the touch area difference is greater than the threshold, performing the step S40 of generating a touch feedback according to the touch area difference, where the processor 40 actuates a feedback generator 50 to generate a touch feedback. However, if it is determined that the touch area difference does not exceed the threshold, returning to perform the step S10 of sensing a first coordinate combination.

By multiple determining steps, in the seventh embodiment, a touch signal to noise ratio, a touch time, and a threshold of a touch area are determined, so that authenticity of a touch can be accurately determined, so as to prevent a feedback resulting from a hit or a mistaken press, thereby avoiding a power loss caused by an improper feedback and producing a power-saving effect.

In conclusion, in the foregoing touch device and feedback method for touch, a sensing module and a processor are used to calculate a press force in a z direction by using a touch area difference, a feedback generator further generates a touch feedback according to the touch area difference, and the sensing module may be embedded into a display panel to produce a three-dimensional touch control effect by means of a light sensing manner in combination with a change of an existing structure. Hence, the touch device can sense a force in a z direction without requiring an additional touch force sensor. In addition, a thickness and manufacturing costs of the touch device may be reduced and optical quality and a product yield rate can be maintained.

Although preferred embodiments of the present disclosure are disclosed as above, they are not intended to limit the present disclosure. Any person skilled in the art may make some variations or modifications without departing from the scope of the present disclosure. Therefore, the protection scope of the present disclosure shall be subject to the protection scope of the appended claims.

What is claimed is:

1. A touch device, comprising:
a sensing module, configured to:
(1) sense a first coordinate combination of a touch and then sense a second coordinate combination when a touch signal to noise ratio of the first coordinate combination is determined to be greater than a first threshold being preset to 5 and when the touch is determined to be exceeding a predetermined time ranging from 3 seconds to 10 seconds, wherein the step of determining the touch signal to noise ratio of the first coordinate combination and the step of determining the touch to be exceeding the predetermined time ranging from 3 seconds to 10 seconds are performed between the step of sensing the first coordinate combination of the touch and the step of sensing the second coordinate combination; and
(2) sense the first coordinate combination of the touch and not sense the second coordinate combination when the touch signal to noise ratio of the first coordinate combination is not greater than the first threshold being preset to 5 or when the touch does not exceed the predetermined time ranging from 3 seconds to 10 seconds;
a processor, configured to generate a touch area difference according to the first coordinate combination and the second coordinate combination after the second coordinate combination is sensed and when a touch signal to noise ratio of the second coordinate combination is greater than a second threshold after the second coordinate combination is sensed; and
wherein the processor is further configured to generate an actuate signal for a touch feedback corresponding to the touch area difference after the touch area difference according to the first coordinate combination and the second coordinate combination is generated and when the touch area difference is greater than a touch-area-difference threshold.

2. The touch device according to claim 1, wherein the processor generates a first area and a second area respectively according to the first coordinate combination and the second coordinate combination, and the touch area difference is a difference between the first area and the second area.

3. The touch device according to claim 2, wherein the sensing module comprises a plurality of photosensitive components, and the photosensitive components sense the first coordinate combination for a first touch and sense the second coordinate combination for a second touch, wherein the first coordinate combination is not equal to the second coordinate combination.

4. The touch device according to claim 3, further comprising a display panel, the display panel comprises a plurality of sub-pixel units, wherein the photosensitive components are disposed correspondingly between the sub-pixel units.

5. The touch device according to claim 4, wherein the display panel further comprises a plurality of color filter layers respectively corresponding to the sub-pixel units and not corresponding to the photosensitive components.

6. The touch device according to claim 5, wherein the color filter layers do not overlap with the photosensitive components.

7. The touch device according to claim 1, wherein the touch feedback comprises at least one of a vibration, a flash, a sound, and an image change.

8. The touch device according to claim 1, wherein the processor is further configured to:
(a) obtain a first area according to the first coordinate combination; and
(b) obtain a second area according to the second coordinate combination,
wherein the touch area difference is a difference between the first area and the second area so that the touch feedback is generated corresponding to the touch area difference.

9. A system comprising a processor to perform a feedback method for touch, the method comprising:
sensing a first coordinate combination of a touch and then sensing a second coordinate combination when a touch signal to noise ratio of the first coordinate combination is determined to be greater than a first threshold being preset to 5 and when the touch is determined to be exceeding a predetermined time ranging from 3 seconds to 10 seconds, wherein the step of determining the touch signal to noise ratio of the first coordinate combination and the step of determining the touch to be exceeding the predetermined time ranging from 3 seconds to 10 seconds are performed between the step of sensing the first coordinate combination of the touch and the step of sensing the second coordinate combination; and
sensing the first coordinate combination of the touch and not sensing the second coordinate combination when the touch signal to noise ratio of the first coordinate combination is not greater than the first threshold being preset to 5 or when the touch does not exceed the predetermined time ranging from 3 seconds to 10 seconds;
generating a touch area difference according to the first coordinate combination and the second coordinate combination after the second coordinate combination is sensed and when a touch signal to noise ratio of the second coordinate combination is greater than a second threshold after the second coordinate combination is sensed; and
generating a touch feedback according to the touch area difference after the touch area difference according to the first coordinate combination and the second coordinate combination is generated and when the touch area difference is greater than a touch-area-difference threshold.

10. The system comprising the processor to perform the feedback method for touch according to claim 9, wherein the step of generating the touch area difference comprises:
generating a first area and a second area respectively according to the first coordinate combination and the second coordinate combination, wherein the touch area difference is a difference between the first area and the second area.

11. The system comprising the processor to perform the feedback method for touch according to claim 9, wherein after the step of sensing the first coordinate combination, executing a security authentication program to determine whether to perform the step of sensing the second coordinate combination.

12. The system comprising the processor to perform the feedback method for touch according to claim 9, wherein the first coordinate combination corresponds to a first pressure, the second coordinate combination corresponds to a second pressure, and the first pressure is not equal to the second pressure.

13. The system comprising the processor to perform the feedback method for touch according to claim 9, further comprising:
obtaining a first area according to the first coordinate combination; and
obtaining a second area according to the second coordinate combination;
wherein the touch area difference is a difference between the first area and the second area.

* * * * *